United States Patent
Arora et al.

(10) Patent No.: US 12,099,434 B2
(45) Date of Patent: Sep. 24, 2024

(54) METHOD AND SYSTEM FOR MANAGING USER STORIES VIA ARTIFICIAL INTELLIGENCE

(71) Applicant: JPMorgan Chase Bank, N.A., New York, NY (US)

(72) Inventors: Mohit Arora, Hyderabad (IN); Santosh Chikoti, Monroe Township, NJ (US); Murali Yaddanapudi, Hyderabad (IN); Sai Gumma, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 100 days.

(21) Appl. No.: 18/092,698

(22) Filed: Jan. 3, 2023

(65) Prior Publication Data

US 2024/0168862 A1 May 23, 2024

(30) Foreign Application Priority Data

Nov. 18, 2022 (IN) .............................. 202211066153

(51) Int. Cl.
*G06F 11/36* (2006.01)
*G06N 3/08* (2023.01)

(52) U.S. Cl.
CPC ........... *G06F 11/3608* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 9,747,895 B1* | 8/2017 | Jansche ................. | G10L 15/183 |
| 2005/0005258 A1* | 1/2005 | Bhogal .................... | G06F 8/73 |
| | | | 717/102 |
| 2014/0229912 A1* | 8/2014 | Furtado .................... | G06F 8/20 |
| | | | 717/120 |
| 2022/0115008 A1* | 4/2022 | Pust ........................ | G10L 15/16 |
| 2022/0245704 A1* | 8/2022 | Xie ..................... | G06Q 30/0627 |
| 2023/0153072 A1* | 5/2023 | Pereira da Silva ....... | G06F 8/10 |
| | | | 717/100 |
| 2023/0289280 A1* | 9/2023 | Yuan ...................... | G06F 16/35 |
| 2023/0305815 A1* | 9/2023 | Li .......................... | G06N 5/022 |
| 2024/0004910 A1* | 1/2024 | Jafar ................... | G06F 16/3329 |
| 2024/0037243 A1* | 2/2024 | Sylvester .............. | G06F 40/242 |

* cited by examiner

*Primary Examiner* — Philip Wang
*Assistant Examiner* — Rongfa P Wang
(74) *Attorney, Agent, or Firm* — GREENBLUM & BERNSTEIN P.L.C.

(57) ABSTRACT

A method for managing user stories in software development via artificial intelligence is disclosed. The method includes aggregating, via an application programming interface, raw data from a software development framework according to a predetermined schedule, the raw data corresponding to user stories from a plurality of users in a natural language format; ingesting the aggregated raw data to generate structured data sets; generating a language model by using a neural network and the structured data sets, the neural network including a transformer component; training, by using the structured data sets, the language model based on predetermined criterions; tuning the trained language model for tasks by adjusting parameters; and exposing, via a communication interface, the tuned language model.

20 Claims, 5 Drawing Sheets

METHOD AND SYSTEM FOR MANAGING USER STORIES VIA ARTIFICIAL INTELLIGENCE

CROSS-REFERENCE TO RELATED APPLICATIONS

This application claims the benefit of Indian Provisional Patent Application No. 202211066153, filed Nov. 18, 2022, which is hereby incorporated by reference in its entirety.

BACKGROUND

1. Field of the Disclosure

This technology generally relates to methods and systems for user story management, and more particularly to methods and systems for managing and qualitatively assessing user stories in a software development environment by using machine learning and artificial intelligence.

2. Background Information

Many business entities rely on user stories to facilitate development of modern software. The user stories may provide a general explanation of a software feature that is written from the perspective of an end user. Often, the user stories are uniquely generated by each developer and/or development team. Historically, implementations of conventional management and analytic techniques have resulted in varying degrees of success with respect to optimizing the user stories.

One drawback of using the conventional management and analytic techniques is that in many instances, the user stories are written in a natural language format and may be unique to the developer and/or development team. As such, automated qualitative assessments of the numerous user stories may not be feasible and current measures are mainly based on quantitative metrics. Additionally, even with great quantitative metrics, low quality user stories with no defined outcomes often translate to suboptimal results.

Therefore, there is a need to leverage state of the art transformer architecture to provide a natural language model that facilitates management and analytics of user stories in a software development environment.

SUMMARY

The present disclosure, through one or more of its various aspects, embodiments, and/or specific features or sub-components, provides, inter alia, various systems, servers, devices, methods, media, programs, and platforms for managing and qualitatively assessing user stories in a software development environment by using machine learning and artificial intelligence.

According to an aspect of the present disclosure, a method for managing user stories in software development via artificial intelligence is disclosed. The method is implemented by at least one processor. The method may include aggregating, via an application programming interface, raw data from a software development framework according to a predetermined schedule, the raw data may correspond to the user stories from a plurality of users in a natural language format; ingesting the aggregated raw data to generate at least one structured data set; generating at least one language model by using a neural network and the at least one structured data set, the neural network may include a transformer component; training, by using the at least one structured data set, the at least one language model based on at least one predetermined criterion; tuning the trained at least one language model for at least one task by adjusting at least one parameter; and exposing, via a communication interface, the tuned at least one language model.

In accordance with an exemplary embodiment, each of the user stories may relate to an element of work in the software development framework, each of the user stories may correspond to an explanation of a software feature.

In accordance with an exemplary embodiment, the method may further include receiving, via a plug-in, a first user request in the natural language format, the first user request may correspond to a search request for at least one thematic story; parsing, by using the exposed at least one language model, the first user request to identify at least one requested attribute; identifying, by using the exposed at least one language model, the at least one thematic story in the raw data, the at least one thematic story may include the at least one requested attribute; and providing, via the plug-in, the identified at least one thematic story in response to the first user request.

In accordance with an exemplary embodiment, the method may further include receiving, via a plug-in, a second user request to classify at least one storyboard, the at least one storyboard may relate to a grouping of the user stories; identifying, by using the exposed at least one language model, at least one characteristic for each of the user stories in the at least one storyboard; automatically tagging each of the user stories in the at least one storyboard with the corresponding at least one characteristic; and automatically categorizing the user stories in the at least one storyboard into at least one classification based on the tagged at least one characteristic.

In accordance with an exemplary embodiment, the method may further include receiving, via a plug-in, a third user request, the third user request may include a recommendation request; detecting, via the plug-in, at least one in progress user story in the software development framework that corresponds to the third user request; comparing, by using the exposed at least one language model, each of the at least one in progress user story to at least one predetermined story template; determining, by using the exposed at least one language model, at least one recommendation based on a result of the comparing; and providing, via the plug-in, the at least one recommendation, wherein the at least one recommendation may relate to a suggested rephrasing of the at least one in progress user story for adherence to the at least one predetermined story template.

In accordance with an exemplary embodiment, the method may further include determining, by using the exposed at least one language model, at least one corrective action for each of the at least one in progress user story based on the corresponding at least one recommendation according to a user preference; and automatically initiating, via the plug-in, the at least one corrective action, wherein the at least one corrective action may resolve a discrepancy between the at least one in progress user story and the at least one predetermined story template.

In accordance with an exemplary embodiment, the method may further include receiving, via a plug-in, a fourth user request in the natural language format; parsing, by using the exposed at least one language model, the fourth user request to identify at least one parameter; and automatically generating, by using the exposed at least one language model, at least one new user story based on the at least one parameter, wherein the at least one new user story may be generated according to at least one predetermined guideline.

In accordance with an exemplary embodiment, the method may further include determining, by using the exposed at least one language model, at least one quality metric for each of the user stories; generating at least one graphical element that graphically represents information that relates to the at least one quality metric, the at least one graphical element may include an information dashboard; and displaying the at least one graphical element via a graphical user interface, wherein the at least one quality metric may include at least one from among an adherence metric, an overhead metric, an uplift metric, a dependency metric, and a defined acceptance criteria metric.

In accordance with an exemplary embodiment, the at least one language model may include at least one from among a machine learning model, a mathematical model, a process model, and a data model.

According to an aspect of the present disclosure, a computing device configured to implement an execution of a method for managing user stories in software development via artificial intelligence is disclosed. The computing device including a processor; a memory; and a communication interface coupled to each of the processor and the memory, wherein the processor may be configured to aggregate, via an application programming interface, raw data from a software development framework according to a predetermined schedule, the raw data may correspond to the user stories from a plurality of users in a natural language format; ingest the aggregated raw data to generate at least one structured data set; generate at least one language model by using a neural network and the at least one structured data set, the neural network may include a transformer component; train, by using the at least one structured data set, the at least one language model based on at least one predetermined criterion; tune the trained at least one language model for at least one task by adjusting at least one parameter; and expose, via the communication interface, the tuned at least one language model.

In accordance with an exemplary embodiment, each of the user stories may relate to an element of work in the software development framework, each of the user stories may correspond to an explanation of a software feature.

In accordance with an exemplary embodiment, the processor may be further configured to receive, via a plug-in, a first user request in the natural language format, the first user request may correspond to a search request for at least one thematic story; parse, by using the exposed at least one language model, the first user request to identify at least one requested attribute; identify, by using the exposed at least one language model, the at least one thematic story in the raw data, the at least one thematic story may include the at least one requested attribute; and provide, via the plug-in, the identified at least one thematic story in response to the first user request.

In accordance with an exemplary embodiment, the processor may be further configured to receive, via a plug-in, a second user request to classify at least one storyboard, the at least one storyboard may relate to a grouping of the user stories; identify, by using the exposed at least one language model, at least one characteristic for each of the user stories in the at least one storyboard; automatically tag each of the user stories in the at least one storyboard with the corresponding at least one characteristic; and automatically categorize the user stories in the at least one storyboard into at least one classification based on the tagged at least one characteristic.

In accordance with an exemplary embodiment, the processor may be further configured to receive, via a plug-in, a third user request, the third user request may include a recommendation request; detect, via the plug-in, at least one in progress user story in the software development framework that corresponds to the third user request; compare, by using the exposed at least one language model, each of the at least one in progress user story to at least one predetermined story template; determine, by using the exposed at least one language model, at least one recommendation based on a result of the comparing; and provide, via the plug-in, the at least one recommendation, wherein the at least one recommendation may relate to a suggested rephrasing of the at least one in progress user story for adherence to the at least one predetermined story template.

In accordance with an exemplary embodiment, the processor may be further configured to determine, by using the exposed at least one language model, at least one corrective action for each of the at least one in progress user story based on the corresponding at least one recommendation according to a user preference; and automatically initiate, via the plug-in, the at least one corrective action, wherein the at least one corrective action may resolve a discrepancy between the at least one in progress user story and the at least one predetermined story template.

In accordance with an exemplary embodiment, the processor may be further configured to receive, via a plug-in, a fourth user request in the natural language format; parse, by using the exposed at least one language model, the fourth user request to identify at least one parameter; and automatically generate, by using the exposed at least one language model, at least one new user story based on the at least one parameter, wherein the at least one new user story may be generated according to at least one predetermined guideline.

In accordance with an exemplary embodiment, the processor may be further configured to determine, by using the exposed at least one language model, at least one quality metric for each of the user stories; generate at least one graphical element that graphically represents information that relates to the at least one quality metric, the at least one graphical element may include an information dashboard; and display the at least one graphical element via a graphical user interface, wherein the at least one quality metric may include at least one from among an adherence metric, an overhead metric, an uplift metric, a dependency metric, and a defined acceptance criteria metric.

In accordance with an exemplary embodiment, the at least one language model may include at least one from among a machine learning model, a mathematical model, a process model, and a data model.

According to an aspect of the present disclosure, a non-transitory computer readable storage medium storing instructions for managing user stories in software development via artificial intelligence is disclosed. The storage medium including executable code which, when executed by a processor, may cause the processor to aggregate, via an application programming interface, raw data from a software development framework according to a predetermined schedule, the raw data may correspond to the user stories from a plurality of users in a natural language format; ingest the aggregated raw data to generate at least one structured data set; generate at least one language model by using a neural network and the at least one structured data set, the neural network may include a transformer component; train, by using the at least one structured data set, the at least one language model based on at least one predetermined criterion; tune the trained at least one language model for at least one task by adjusting at least one parameter; and expose, via the communication interface, the tuned at least one language model.

In accordance with an exemplary embodiment, each of the user stories may relate to an element of work in the software development framework, each of the user stories may correspond to an explanation of a software feature.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
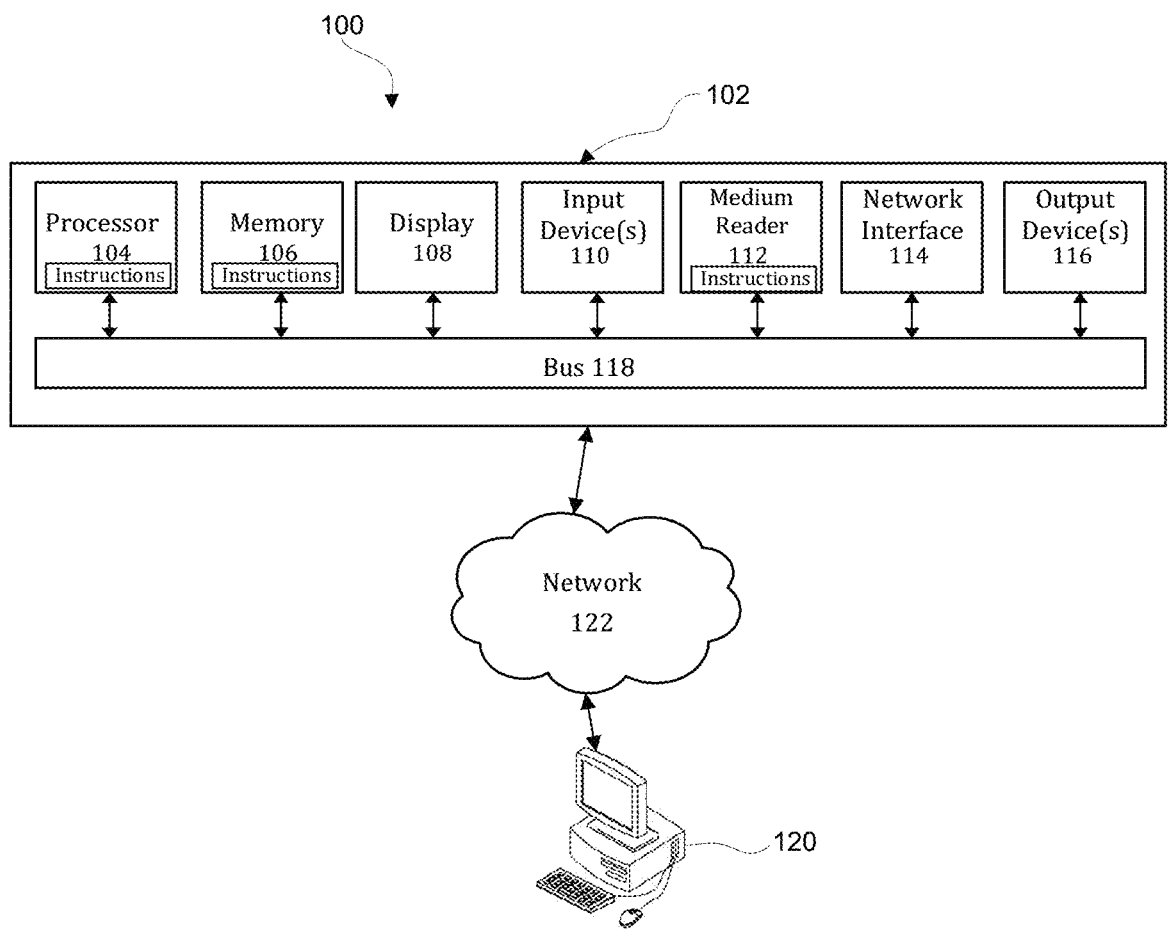
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for managing and qualitatively assessing user stories in a software development environment by using machine learning and artificial intelligence.

Figure 2:
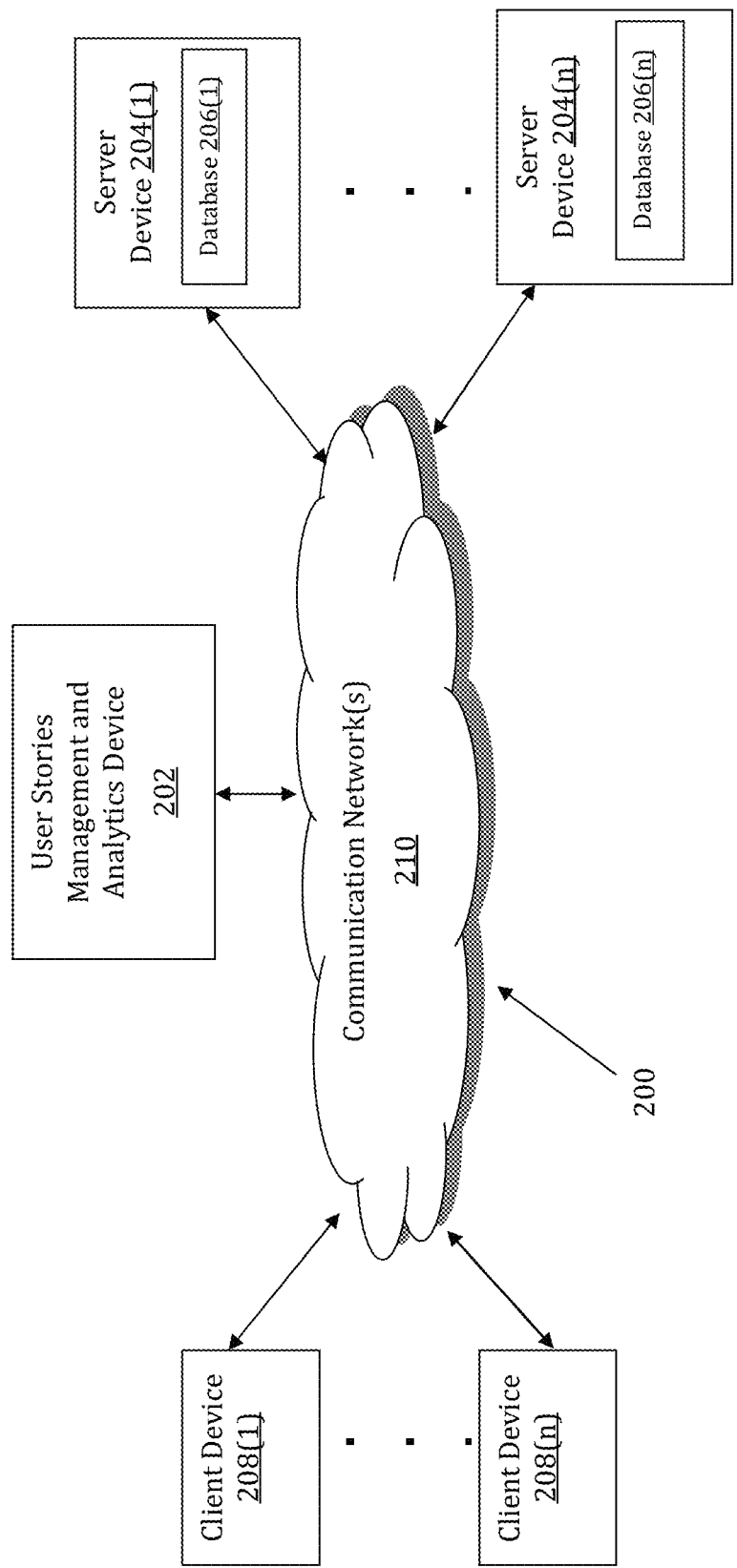
FIG. 2 illustrates an exemplary diagram of a network environment.

Referring to FIG. 2, a schematic of an exemplary network environment 200 for implementing a method for managing and qualitatively assessing user stories in a software development environment by using machine learning and artificial intelligence is illustrated. In an exemplary embodiment, the method is executable on any networked computer platform, such as, for example, a personal computer (PC).

The method for managing and qualitatively assessing user stories in a software development environment by using machine learning and artificial intelligence may be implemented by a User Stories Management and Analytics (USMA) device 202. The USMA device 202 may be the same or similar to the computer system 102 as described with respect to FIG. 1. The USMA device 202 may store one or more applications that can include executable instructions that, when executed by the USMA device 202, cause the USMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the USMA device 202 itself, may be located in virtual server(s) running in a cloud-based computing environment rather than being tied to one or more specific physical network computing devices. Also, the application(s) may be running in one or more virtual machines (VMs) executing on the USMA device 202. Additionally, in one or more embodiments of this technology, virtual machine(s) running on the USMA device 202 may be managed or supervised by a hypervisor.

In the network environment 200 of FIG. 2, the USMA device 202 is coupled to a plurality of server devices 204(1)-204(n) that hosts a plurality of databases 206(1)-206(n), and also to a plurality of client devices 208(1)-208(n) via communication network(s) 210. A communication interface of the USMA device 202, such as the network interface 114 of the computer system 102 of FIG. 1, operatively couples and communicates between the USMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the USMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and USMA devices that efficiently implement a method for managing and qualitatively assessing user stories in a software development environment by using machine learning and artificial intelligence.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The USMA device 202 may be a standalone device or integrated with one or more other devices or apparatuses, such as one or more of the server devices 204(1)-204(n), for example. In one particular example, the USMA device 202 may include or be hosted by one of the server devices 204(1)-204(n), and other arrangements are also possible. Moreover, one or more of the devices of the USMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the USMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to user stories, raw data, schedules, natural language formats, structured data sets, language models, machine learning models, neural networks, predetermined criteria, parameters, and metrics.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the USMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the USMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the USMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the USMA device 202, the server devices 204(1)-204(n), or the client devices 208(1)-208(n), for example, may be configured to operate as virtual instances on the same physical machine. In other words, one or more of the USMA device 202, the server devices 204(1)-204(n), or the client devices 208(1)-208(n) may operate on the same physical device rather than as separate devices communicating through communication network(s) 210. Additionally, there may be more or fewer USMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
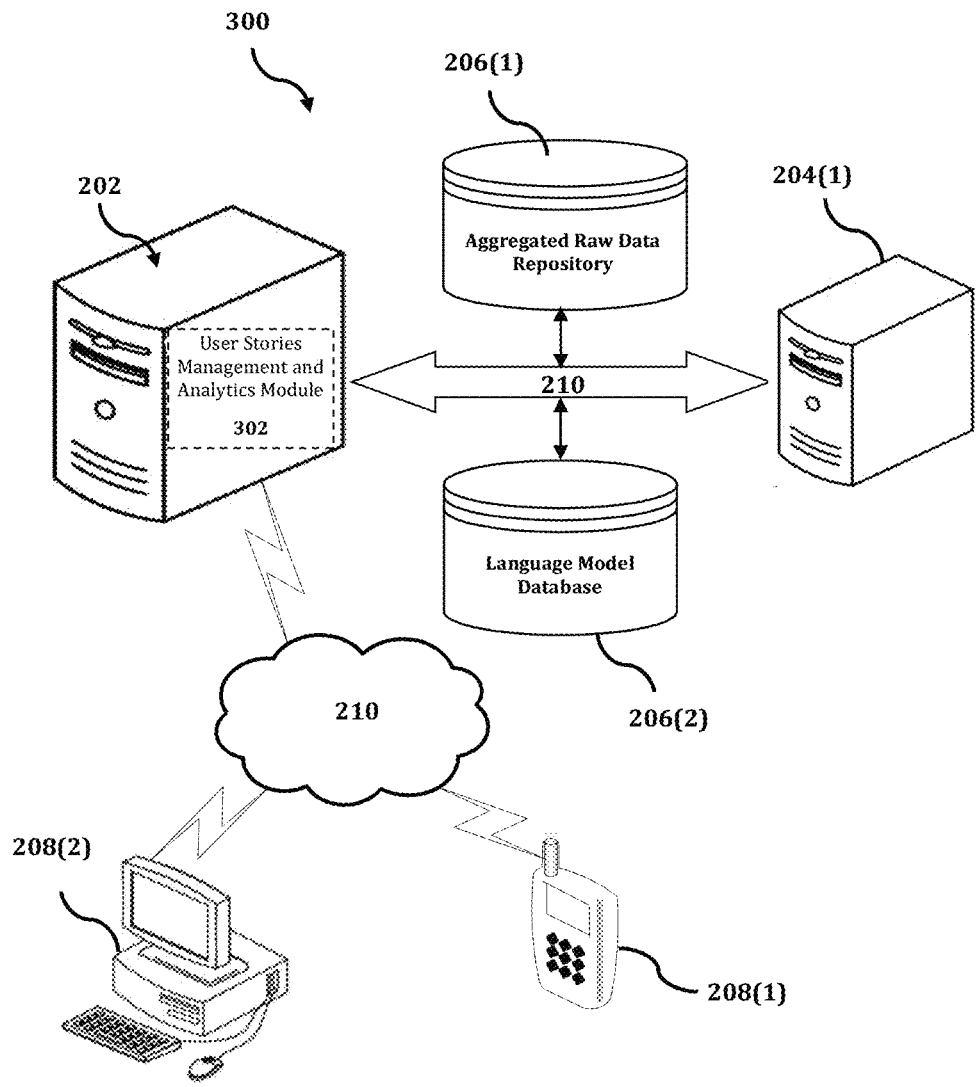
FIG. 3 shows an exemplary system for implementing a method for managing and qualitatively assessing user stories in a software development environment by using machine learning and artificial intelligence.

The USMA device 202 is described and shown in FIG. 3 as including a user stories management and analytics module 302, although it may include other rules, policies, modules, databases, or applications, for example. As will be described below, the user stories management and analytics module 302 is configured to implement a method for managing and qualitatively assessing user stories in a software development environment by using machine learning and artificial intelligence.

An exemplary process 300 for implementing a mechanism for managing and qualitatively assessing user stories in a software development environment by using machine learning and artificial intelligence by utilizing the network environment of FIG. 2 is shown as being executed in FIG. 3. Specifically, a first client device 208(1) and a second client device 208(2) are illustrated as being in communication with USMA device 202. In this regard, the first client device 208(1) and the second client device 208(2) may be "clients" of the USMA device 202 and are described herein as such. Nevertheless, it is to be known and understood that the first client device 208(1) and/or the second client device 208(2) need not necessarily be "clients" of the USMA device 202, or any entity described in association therewith herein. Any additional or alternative relationship may exist between either or both of the first client device 208(1) and the second client device 208(2) and the USMA device 202, or no relationship may exist.

Further, USMA device 202 is illustrated as being able to access an aggregated raw data repository 206(1) and a language model database 206(2). The user stories management and analytics module 302 may be configured to access these databases for implementing a method for managing and qualitatively assessing user stories in a software development environment by using machine learning and artificial intelligence.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the USMA device 202 via broadband or cellular communication. Of course, these embodiments are merely exemplary and are not limiting or exhaustive.

Upon being started, the user stories management and analytics module 302 executes a process for managing and qualitatively assessing user stories in a software development environment by using machine learning and artificial intelligence. An exemplary process for managing and qualitatively assessing user stories in a software development environment by using machine learning and artificial intelligence is generally indicated at flowchart 400 in FIG. 4.

Figure 4:
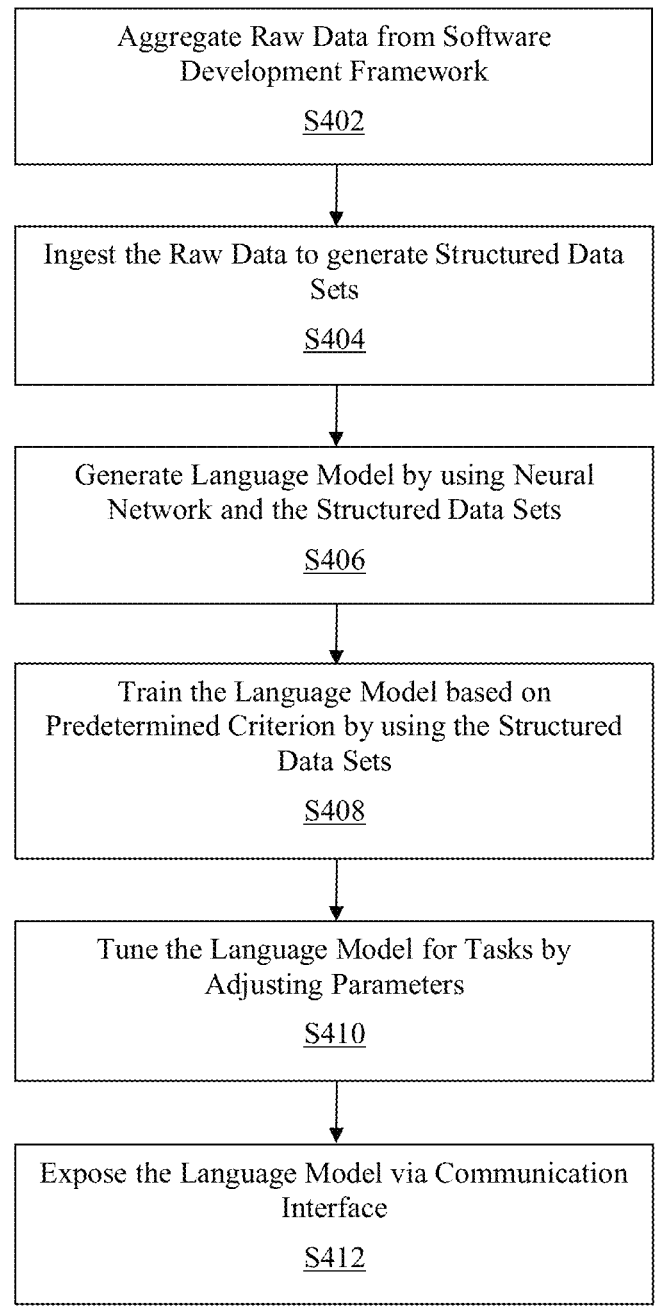
FIG. 4 is a flowchart of an exemplary process for implementing a method for managing and qualitatively assessing user stories in a software development environment by using machine learning and artificial intelligence.

In the process 400 of FIG. 4, at step S402, raw data from a software development framework may be aggregated. The raw data may be aggregated via an application programming interface (API) according to a predetermined schedule. In an exemplary embodiment, the raw data may correspond to user stories from a plurality of users. The raw data may be in natural language format. The natural language format may relate to a human language such as, for example, English as opposed to a machine language such as, for example, computing code.

In another exemplary embodiment, the raw data may include user stories. Each of the user stories may relate to an element of work in the software development framework and each of the user stories may correspond to an explanation of a software feature. The element of work may relate to the smallest component of a software development process such as, for example, a task or an activity. In another exemplary embodiment, the user stories may represent an end goal as expressed from the perspective of an end user. The user stories may correspond to an informal, general explanation of a software feature that is written from the perspective of the end user. The user stories may articulate how a piece of work will deliver a particular value to the end user. In another exemplary embodiment, the user stories may include a few sentences in a natural language format that outline the desired outcome. User stories may be grouped into larger structures such as, for example, epics and initiatives. Epics may correspond to large work items that are broken down into a set of stories and multiple epics may together form an initiative.

In another exemplary embodiment, raw data may include original data in a source data format. The original data may relate to unprocessed data that have been retrieved from a data source. For example, the raw data may correspond to a collection of information that is gathered from a data source before the raw data has been further processed, cleaned, and/or analyzed. In another exemplary embodiment, the data source may correspond to a software development framework. The software development framework may relate to an iterative approach to project management and software development such as, for example, AGILE that helps development teams deliver work in small but consumable increments. Development requirements, plans, and results may be evaluated continuously in the software development framework so that teams have a natural mechanism for responding quickly to changes.

In another exemplary embodiment, the raw data may be aggregated via an API according to a predetermined schedule. The API may relate to a connection between computer programs. The API may include a type of software interface that offers a service to other software programs. The API may correspond to a software intermediary that enables communication between two software programs.

In another exemplary embodiment, the predetermined schedule may correspond to a regular time interval upon which the raw data may be aggregated from the software development framework. For example, the predetermined schedule may dictate that the raw data is aggregated daily at a set time from the software development framework. In another exemplary embodiment, the predetermined schedule may correspond to a time interval that is dependent upon an additional factor. For example, the predetermined schedule may dictate that the raw data is aggregated daily only during periods of low network utilization. In another exemplary embodiment, the raw data may be aggregated via the API in an ad hoc manner based on user preference. For example, an administrative user may interact with the claimed invention to indicate a desire to aggregate the raw data.

At step S404, the aggregated raw data may be ingested to generate structured data sets. In an exemplary embodiment, the natural language information in the raw data may be parsed into individual data elements by using natural language processing techniques. The data elements may be filtered and cleaned consistent with present disclosures to remove unnecessary components such as, for example, spacing between words. The data elements may facilitate structuring of the raw data based on data processing requirements.

In another exemplary embodiment, traits of the data elements may be identified. The traits may correspond to a type of data such as, for example, a number or a symbol that provides context to the data elements. In another exemplary embodiment, the data elements may be selected for inclusion into the structured data sets based on the traits. The data elements may be extracted from the raw data for inclusion in the structured data sets. For example, numbers may be identified in the raw data based on the associated trait and extracted for inclusion in a structured data set.

At step S406, a language model may be generated by using a neural network and the structured data sets. The neural network may include a transformer component. In an exemplary embodiment, the transformer component may relate to a deep learning model that differentially weighs the significance of each part of a set of input data. The transformer component may process sequential input data such as, for example, natural language data. In another exemplary embodiment, the transformer component may include a self-attention mechanism. The self-attention mechanism may enable a model to draw from the state at any preceding point along the sequence. The self-attention mechanism may access all previous states and weigh them according to a learned measure of relevance and provides relevant information about far-away tokens. For example, the self-attention mechanism may be usable to assign a meaning to a word based on the context of the word within a sentence.

In another exemplary embodiment, the language model may include at least one from among a machine learning model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the language model may correspond to a natural language processing model that relates to a plurality of natural language processing techniques. The natural language processing techniques may include at least one from among a sentiment analysis technique, a named entity recognition technique, a summarization technique, a topic modeling technique, a text classification technique, a keyword extraction technique, and a lemmatization and stemming technique. As will be appreciated by a person of ordinary skill in the art, natural language processing may relate to computer processing and analyzing of large quantities of natural language data.

At step S408, the language model may be trained by using the structured data set. The language model may be trained based on predetermined criteria. In an exemplary embodiment, the structured data set may include training data that reflects the performance of the language model. The training data may include user feedback data that details the accuracy of past predictions when compared to actual results. In another exemplary embodiment, the predetermined criteria may include performance benchmarks such as, for example, an accuracy benchmark that governs the language model training process. The performance benchmarks may be based on guidelines such as, for example, a business usage guideline.

At step S410, the trained language model may be tuned to perform various tasks. The language model may be tuned based on adjustments of parameters associated with the model. In an exemplary embodiment, the language model may be fine-tuned to perform multiple machine learning tasks. The language model may be tuned to perform tasks such as, for example, semantic search tasks, token classification tasks, text classification tasks, and text generation tasks. In another exemplary embodiment, tuning the language model may correspond to a process of maximizing language model performance without overfitting and/or creating high variances. The fine-tuning process may enable a model that has already been trained for a particular task to perform a second task. For example, a language model that has been trained to qualitatively evaluate user stories may be tuned to also identify thematically similar user stories in a data set.

At step S412, the tuned language model may be exposed in a network environment. The language model may be exposed via a communication interface to enable access to the language model by components in the network environment. In an exemplary embodiment, exposure of the language model may be equivalent to deployment of the language model. The language model may be deployed as an on-demand service as well as in batch processing mode. The on-demand service may enable connected components such as, for example, analytic components to access the language model ad hoc. The batch processing mode may enable the connected components to provide a payload of several user stories to the language model in regular intervals.

In another exemplary embodiment, a semantic search capability may be enabled by using the language model. To enable the semantic search capability, a first user request in a natural language format may be received via a plug-in that is integrated with the software development framework. The first user request may correspond to a search request for thematic stories. The thematic stories may include user stories that share common attributes. Then, the exposed language model may be used to parse the first user request and identify requested attributes. Using the requested attributes, the exposed language model may then identify the thematic stories in the aggregated raw data. The thematic stories may be identified by matching an attribute of each of the user stories with the requested attribute in the first user request. Finally, the identified thematic stories may be provided to a user in response to the first user request via the plug-in.

In another exemplary embodiment, a classification capability may be enabled by using the language model. To enable the classification capability, a second user request to classify a storyboard may be received via a plug-in that is integrated with the software development framework. The storyboard may relate to a grouping of user stories that provides a high-level overview of a project. Then, by using the exposed language model, characteristics for each of the user stories in the storyboard may be identified. For example, the characteristics may relate to information about a particular component of the project that is represented by the corresponding user story. Each of the user stories in the storyboard may be automatically tagged with the corresponding characteristic. The tag may be usable to associate characteristics with corresponding user stories.

Finally, the user stories in the storyboard may be automatically categorized into classifications based on the tagged characteristics. Consistent with present disclosures, the classified user stories may be grouped and graphically represented on the storyboard. For example, user stories with similar classifications may be graphically represented closer together in the storyboard and/or with similar color themes.

In another exemplary embodiment, a recommendation capability may be enabled by using the language model. To enable the recommendation capability, a third user request may be received via a plug-in that is integrated with the software development framework. The third user request may include a recommendation request to rephrase user stories in adherence to a standard template. In response to the third user request, in progress user stories may be detected in the software development framework. The in progress user stories may relate to pending stories in a workspace of a user associated with the third user request. Once detected, each of the in progress user stories may be compared to a predetermined story template such as, for example, a standard user story template. The in progress user stories may be compared to the predetermined story template by using the exposed language model.

Then, recommendations may be determined by using the exposed language model. The recommendations may be determined based on a result of the comparing. The recommendations may relate to a suggested rephrasing of the in progress user stories for adherence to the predetermined story template. For example, when a result of the comparing indicates that the in progress user stories are different from the predetermined story template, the recommendations may include word choice suggestions and phrasing suggestions to bring the in progress user stories closer to the predetermined story template. Finally, the recommendations may be provided to a user in response to the third user request via the plug-in.

In another exemplary embodiment, corrective actions for each of the in progress user stories may be determined in real-time by using the exposed language model. The corrective actions may be determined based on the corresponding recommendations according to a user preference. The corrective actions may resolve a discrepancy between the in progress user stories and the predetermined story template. The user preference may indicate a desire by a developer and/or development team to automatically correct the in progress user stories based on the recommendations. Then, the corrective actions may be automatically initiated via the plug-in consistent with the user preference. A notification may be generated for the user upon completion of the corrective action. The notification may include information that relates to the user stories, the recommendations, and the corrective actions.

In another exemplary embodiment, a canned user stories capability may be enabled by using the language model. To enable the canned user stories capability, a fourth user request in a natural language format may be received via a plug-in that is integrated with the software development framework. The fourth user request may be parsed by using the exposed language model to identify parameters. The parameters may include information such as, for example, a component type that is usable to create a user story. Then, new user stories may be automatically generated based on the parameters. The new user stories may be automatically generated by using the exposed language model without additional user intervention. The new user stories may be generated according to a predetermined guideline that governs user story creation such as, for example, a standard template for generating new user stories.

In another exemplary embodiment, quality metrics may be determined by using the exposed language model to provide additional insights for decision makers. The quality metrics may be determined for each of the aggregated user stories by using the exposed language model. Then, graphical elements that graphically represents information that relates to the quality metrics may be generated. The graphical elements may include an information dashboard that organizes different data types for users. Additionally, the determined quality metrics may also be streamed to dashboards of compatible support platforms. The graphical elements may be displayed via a graphical user interface for consumption by a user.

In another exemplary embodiment, the quality metrics may include at least one from among an adherence metric, an overhead metric, an uplift metric, a dependency metric, and a defined acceptance criteria metric. The adherence metric may represent a user story's adherence to standard story templates and framework principles. The overhead metric may represent an engineering versus non-engineering overhead of the user stories. The uplift metric may represent and learning and/or skill level uplift of a developer based on associated user stories. The dependency metric may represent a user story's dependency to other stories and/or storyboards. The defined acceptance criteria metric may represent how closely a user story is to satisfying corresponding defined acceptance criteria. The defined acceptance criteria may refer to a set of predetermined requirements that must be met before a user story is marked as complete.

Figure 5:
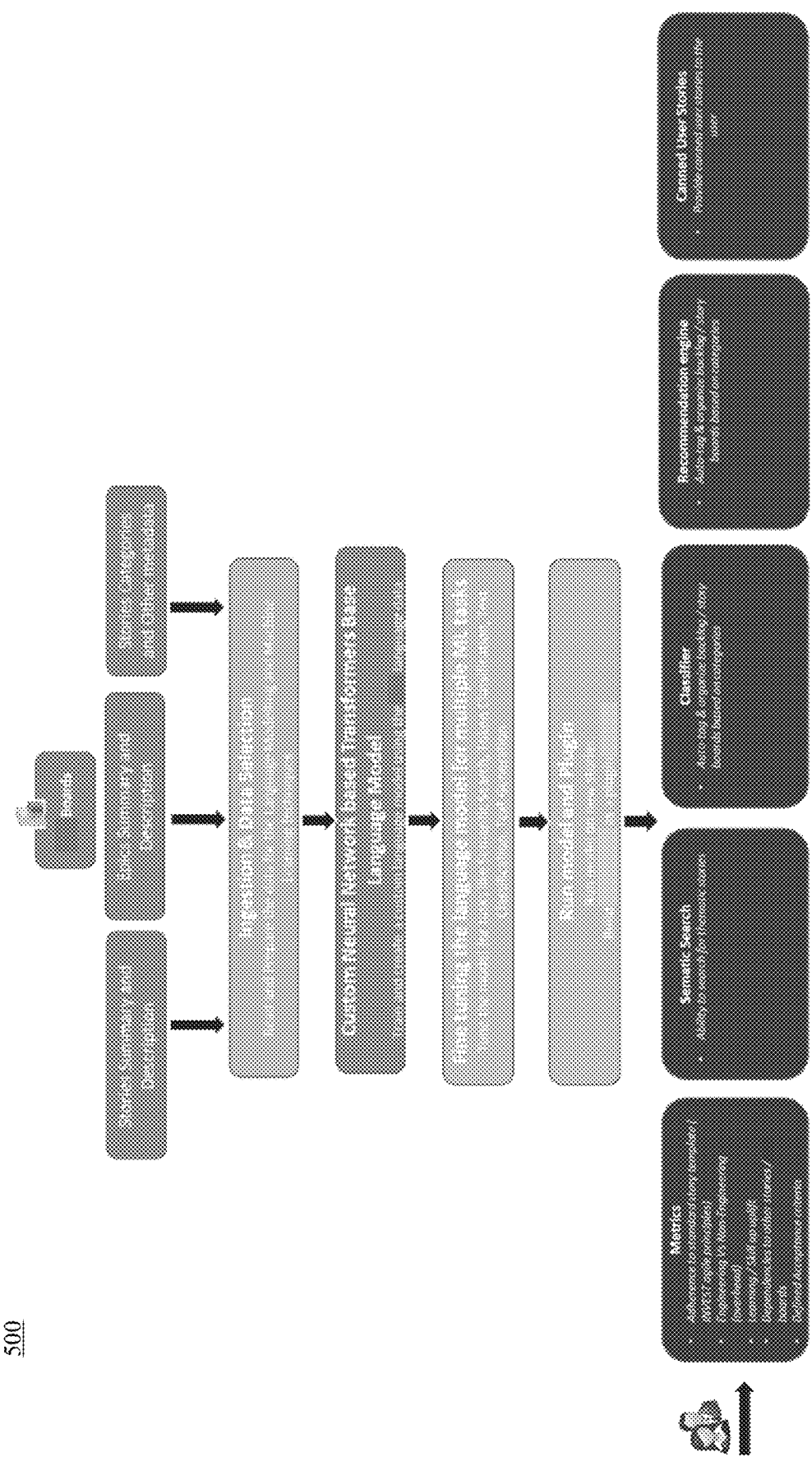
FIG. 5 is an architecture diagram of an exemplary process for implementing a method for managing and qualitatively assessing user stories in a software development environment by using machine learning and artificial intelligence.

FIG. 5 is an architecture diagram 500 of an exemplary process for implementing a method for managing and qualitatively assessing user stories in a software development environment by using machine learning and artificial intelligence. In FIG. 5, a language model may be generated consistent with present disclosures and exposed for use in a software development framework.

As illustrated in FIG. 5, in the first step, raw data may be aggregated from storyboards in the software development framework. The raw data may include user story summaries and corresponding descriptions, epics summary and corresponding descriptions, and user story categories and other metadata. The epics may correspond to a large user story that can be broken down into a number of smaller stories. The epics may span more than one project when multiple projects are included in the story board where the epic is created.

Then, in the second step, the aggregated raw data may be ingested for data selection. The raw data may be read and prepared for the language modelling and machine learning techniques. In the third step, customized neural networks may be implemented to generate and train a language model by using the ingested language data. The neural networks may utilize transformers based language modeling to facilitate the training and the generating. In the fourth step, after the language model has been generated and trained, the language model may be fine-tuned for multiple machine learning tasks. The language model may be tuned for tasks such as, for example, semantic searching tasks, token classification tasks, text classification tasks, and text generation tasks.

In the fifth step, the tuned model may be deployed together with an associated plug-in. The plug-in may be integrated into the software development framework to provide services in a development environment consistent with present disclosures. The tuned language model may be configured to analyze new user stories as well as previously aggregated user stories. The tuned language model may output qualitative metrics such as, for example, a score that measure adherence to standard story templates and development framework principles, engineering versus non-engineering overhead, learning and/or skill uplift, dependency to other user stories and storyboards, as well as satisfaction of defined acceptance criteria.

Accordingly, with this technology, an optimized process for managing and qualitatively assessing user stories in a software development environment by using machine learning and artificial intelligence is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing user stories in software development via artificial intelligence, the method being implemented by at least one processor, the method comprising:
   aggregating, by the at least one processor via an application programming interface, raw data from a software development framework according to a predetermined schedule, the raw data corresponding to the user stories from a plurality of users in a natural language format;
   ingesting, by the at least one processor, the aggregated raw data to generate at least one structured data set;
   generating, by the at least one processor, at least one language model by using a neural network and the at least one structured data set, the neural network including a transformer component;
   training, by the at least one processor using the at least one structured data set, the at least one language model based on at least one predetermined criterion;
   tuning, by the at least one processor, the trained at least one language model for at least one task by adjusting at least one parameter; and
   exposing, by the at least one processor via a communication interface, the tuned at least one language model.

2. The method of claim 1, wherein each of the user stories relates to an element of work in the software development framework, each of the user stories corresponding to an explanation of a software feature.

3. The method of claim 1, further comprising:
   receiving, by the at least one processor via a plug-in, a first user request in the natural language format, the first user request corresponding to a search request for at least one thematic story;
   parsing, by the at least one processor using the exposed at least one language model, the first user request to identify at least one requested attribute;
   identifying, by the at least one processor using the exposed at least one language model, the at least one thematic story in the raw data, the at least one thematic story including the at least one requested attribute; and
   providing, by the at least one processor via the plug-in, the identified at least one thematic story in response to the first user request.

4. The method of claim 1, further comprising:
   receiving, by the at least one processor via a plug-in, a second user request to classify at least one storyboard, the at least one storyboard relating to a grouping of the user stories;
   identifying, by the at least one processor using the exposed at least one language model, at least one characteristic for each of the user stories in the at least one storyboard;
   automatically tagging, by the at least one processor, each of the user stories in the at least one storyboard with the corresponding at least one characteristic; and
   automatically categorizing, by the at least one processor, the user stories in the at least one storyboard into at least one classification based on the tagged at least one characteristic.

5. The method of claim 1, further comprising:
   receiving, by the at least one processor via a plug-in, a third user request, the third user request including a recommendation request;

detecting, by the at least one processor via the plug-in, at least one in progress user story in the software development framework that corresponds to the third user request;
comparing, by the at least one processor using the exposed at least one language model, each of the at least one in progress user story to at least one predetermined story template;
determining, by the at least one processor using the exposed at least one language model, at least one recommendation based on a result of the comparing; and
providing, by the at least one processor via the plug-in, the at least one recommendation,
wherein the at least one recommendation relates to a suggested rephrasing of the at least one in progress user story for adherence to the at least one predetermined story template.

6. The method of claim 5, further comprising:
determining, by the at least one processor using the exposed at least one language model, at least one corrective action for each of the at least one in progress user story based on the corresponding at least one recommendation according to a user preference; and
automatically initiating, by the at least one processor via the plug-in, the at least one corrective action,
wherein the at least one corrective action resolves a discrepancy between the at least one in progress user story and the at least one predetermined story template.

7. The method of claim 1, further comprising:
receiving, by the at least one processor via a plug-in, a fourth user request in the natural language format;
parsing, by the at least one processor using the exposed at least one language model, the fourth user request to identify at least one parameter; and
automatically generating, by the at least one processor using the exposed at least one language model, at least one new user story based on the at least one parameter,
wherein the at least one new user story is generated according to at least one predetermined guideline.

8. The method of claim 1, further comprising:
determining, by the at least one processor using the exposed at least one language model, at least one quality metric for each of the user stories;
generating, by the at least one processor, at least one graphical element that graphically represents information that relates to the at least one quality metric, the at least one graphical element including an information dashboard; and
displaying, by the at least one processor, the at least one graphical element via a graphical user interface,
wherein the at least one quality metric includes at least one from among an adherence metric, an overhead metric, an uplift metric, a dependency metric, and a defined acceptance criteria metric.

9. The method of claim 1, wherein the at least one language model includes at least one from among a machine learning model, a mathematical model, a process model, and a data model.

10. A computing device configured to implement an execution of a method for managing user stories in software development via artificial intelligence, the computing device comprising:
a processor;
a memory; and
a communication interface coupled to each of the processor and the memory,
wherein the processor is configured to:
aggregate, via an application programming interface, raw data from a software development framework according to a predetermined schedule, the raw data corresponding to the user stories from a plurality of users in a natural language format;
ingest the aggregated raw data to generate at least one structured data set;
generate at least one language model by using a neural network and the at least one structured data set, the neural network including a transformer component;
train, by using the at least one structured data set, the at least one language model based on at least one predetermined criterion;
tune the trained at least one language model for at least one task by adjusting at least one parameter; and
expose, via the communication interface, the tuned at least one language model.

11. The computing device of claim 10, wherein each of the user stories relates to an element of work in the software development framework, each of the user stories corresponding to an explanation of a software feature.

12. The computing device of claim 10, wherein the processor is further configured to:
receive, via a plug-in, a first user request in the natural language format, the first user request corresponding to a search request for at least one thematic story;
parse, by using the exposed at least one language model, the first user request to identify at least one requested attribute;
identify, by using the exposed at least one language model, the at least one thematic story in the raw data, the at least one thematic story including the at least one requested attribute; and
provide, via the plug-in, the identified at least one thematic story in response to the first user request.

13. The computing device of claim 10, wherein the processor is further configured to:
receive, via a plug-in, a second user request to classify at least one storyboard, the at least one storyboard relating to a grouping of the user stories;
identify, by using the exposed at least one language model, at least one characteristic for each of the user stories in the at least one storyboard;
automatically tag each of the user stories in the at least one storyboard with the corresponding at least one characteristic; and
automatically categorize the user stories in the at least one storyboard into at least one classification based on the tagged at least one characteristic.

14. The computing device of claim 10, wherein the processor is further configured to:
receive, via a plug-in, a third user request, the third user request including a recommendation request;
detect, via the plug-in, at least one in progress user story in the software development framework that corresponds to the third user request;
compare, by using the exposed at least one language model, each of the at least one in progress user story to at least one predetermined story template;
determine, by using the exposed at least one language model, at least one recommendation based on a result of the comparing; and
provide, via the plug-in, the at least one recommendation, wherein the at least one recommendation relates to a suggested rephrasing of the at least one in progress user story for adherence to the at least one predetermined story template.

15. The computing device of claim 14, wherein the processor is further configured to:
   determine, by using the exposed at least one language model, at least one corrective action for each of the at least one in progress user story based on the corresponding at least one recommendation according to a user preference; and
   automatically initiate, via the plug-in, the at least one corrective action,
   wherein the at least one corrective action resolves a discrepancy between the at least one in progress user story and the at least one predetermined story template.

16. The computing device of claim 10, wherein the processor is further configured to:
   receive, via a plug-in, a fourth user request in the natural language format;
   parse, by using the exposed at least one language model, the fourth user request to identify at least one parameter; and
   automatically generate, by using the exposed at least one language model, at least one new user story based on the at least one parameter,
   wherein the at least one new user story is generated according to at least one predetermined guideline.

17. The computing device of claim 10, wherein the processor is further configured to:
   determine, by using the exposed at least one language model, at least one quality metric for each of the user stories;
   generate at least one graphical element that graphically represents information that relates to the at least one quality metric, the at least one graphical element including an information dashboard; and
   display the at least one graphical element via a graphical user interface,
   wherein the at least one quality metric includes at least one from among an adherence metric, an overhead metric, an uplift metric, a dependency metric, and a defined acceptance criteria metric.

18. The computing device of claim 10, wherein the at least one language model includes at least one from among a machine learning model, a mathematical model, a process model, and a data model.

19. A non-transitory computer readable storage medium storing instructions for managing user stories in software development via artificial intelligence, the storage medium comprising executable code which, when executed by a processor, causes the processor to:
   aggregate, via an application programming interface, raw data from a software development framework according to a predetermined schedule, the raw data corresponding to the user stories from a plurality of users in a natural language format;
   ingest the aggregated raw data to generate at least one structured data set;
   generate at least one language model by using a neural network and the at least one structured data set, the neural network including a transformer component;
   train, by using the at least one structured data set, the at least one language model based on at least one predetermined criterion;
   tune the trained at least one language model for at least one task by adjusting at least one parameter; and
   expose, via the communication interface, the tuned at least one language model.

20. The storage medium of claim 19, wherein each of the user stories relates to an element of work in the software development framework, each of the user stories corresponding to an explanation of a software feature.

* * * * *